United States Patent
Shimizu et al.

(10) Patent No.: US 10,393,548 B2
(45) Date of Patent: Aug. 27, 2019

(54) LINEAR MOTOR SYSTEM, MOVABLE BODY SYSTEM AND ELECTRICAL ANGLE ESTIMATING METHOD

(71) Applicant: MURATA MACHINERY, LTD., Kyoto-shi, Kyoto (JP)

(72) Inventors: Tetsuya Shimizu, Kyoto (JP); Yasutake Yamada, Inuyama (JP); Kenji Kadoguchi, Inuyama (JP); Shogo Terada, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 15/785,058

(22) Filed: Oct. 16, 2017

(65) Prior Publication Data
US 2018/0113002 A1    Apr. 26, 2018

(30) Foreign Application Priority Data
Oct. 20, 2016    (JP) .................. 2016-205812

(51) Int. Cl.
*G01D 5/14*    (2006.01)
*H02K 11/215*   (2016.01)
*H02K 41/03*    (2006.01)

(52) U.S. Cl.
CPC ........... *G01D 5/145* (2013.01); *H02K 11/215* (2016.01); *H02K 41/031* (2013.01)

(58) Field of Classification Search
CPC ..... G01D 5/145; H02K 11/215; H02K 41/031
USPC ...... 324/600, 624–633, 200, 207.13, 207.14, 324/219–259, 160, 177, 179, 500, 545, 324/76.11, 137, 86, 220, 750.16
See application file for complete search history.

(56) References Cited

U.S. PATENT DOCUMENTS

| | | | |
|---|---|---|---|
| 5,907,200 A * | 5/1999 | Chitayat | G01D 5/145 310/12.24 |
| 2008/0265690 A1 | 10/2008 | Sasaki et al. | |
| 2010/0310994 A1 | 12/2010 | Asano | |
| 2016/0072367 A1 | 3/2016 | Yamada et al. | |
| 2017/0050670 A1* | 2/2017 | Kuramitsu | B62D 5/0484 |

FOREIGN PATENT DOCUMENTS

| | | |
|---|---|---|
| JP | 2003-289692 A | 10/2003 |
| JP | 2004-056872 A | 2/2004 |
| JP | 2008-271753 A | 11/2008 |
| JP | 2012-175852 A | 9/2012 |

\* cited by examiner

*Primary Examiner* — Melissa J Koval
*Assistant Examiner* — Trung Nguyen
(74) *Attorney, Agent, or Firm* — DLA Piper LLP (US)

(57) ABSTRACT

A linear motor system that includes a field system in which magnets are arrayed such that polarities are alternately different, armatures, a magnetic detector which includes first, second and third hall elements, and in which an electrical angle phase of the third hall element is shifted from that of the first hall element by 90° and an electrical angle phase of the second hall element is shifted from that of the first hall element by 180°, and a calculator which calculates a first electrical angle from outputs of the first and the third hall elements, calculates a second electrical angle from outputs of the second and the third hall elements, and calculates an estimated value of an electrical angle by weighting is provided. An electrical angle with a larger amplitude between the first and the second electrical angles is multiplied by a relatively larger coefficient value.

11 Claims, 7 Drawing Sheets

LINEAR MOTOR SYSTEM, MOVABLE BODY SYSTEM AND ELECTRICAL ANGLE ESTIMATING METHOD

CROSS-REFERENCE TO RELATED APPLICATIONS

This application claims priority under 35 U.S.C. 119 to Japanese Patent Application No. 2016-205812, filed on Oct. 20, 2016, which application is hereby incorporated by reference in its entirety.

BACKGROUND OF THE INVENTION

1. Field of the Invention

The present invention relates to a linear motor system, a movable body system, and an electrical angle estimating method.

2. Description of Related Art

A linear motor system has been used for a movable body system such as a transport vehicle system. A movable body system including a movable body (a transport vehicle) and a movement route (track) for the transport vehicle is known. The track includes magnets which are arrayed such that polarities, south and north poles, are alternately different. The transport vehicle includes armatures (a first motor and a second motor). The above magnets and armatures constitute a linear motor. The transport vehicle is provided with magnetic detection parts that detect a magnetic field generated by the magnets. The linear motor is driven and controlled by using an electrical angle calculated from outputs of the magnetic detection parts.

The magnetic detection parts are provided on front and rear sides of the transport vehicle in a movement direction with respect to the armatures. However, the magnetic detection parts as thus disposed are distant from the armatures and thus disadvantageous in highly accurate drive control. For example, at the time of the transport vehicle taking a curve, in the positional relation between the magnets and the magnetic detection parts, positional displacement between the magnets and the armatures increases, resulting in a large error included in an electrical angle calculated from detection results of the magnetic detection parts. In order to cope with this problem, there has been proposed a linear motor in which each of magnetic detection parts is disposed on an armature.

When each of the magnetic detection part is disposed on the armature as described above, the magnetic detection parts are influenced by excitation of the armatures, leading to a large error included in an electrical angle calculated from detection results of the magnetic detection parts. The present invention has been made in view of the circumstances described above, and it is an object of the present invention to provide a linear motor system, a movable body system, and an electrical angle estimating method, which are capable of estimating an electrical angle with high accuracy.

BRIEF SUMMARY OF THE INVENTION

One aspect of a linear motor system of the present invention includes: a field system in which magnets are arrayed such that polarities are alternately different; a magnetic detector which includes a first hall element, a second hall element, and a third hall element that are disposed in ranges of the armatures in a movement direction of the armatures with respect to the field system and detects a magnetic field generated by the field system, and in which an electrical angle phase of the third hall element is shifted from an electrical angle phase of the first hall element by 90° and an electrical angle phase of the second hall element is shifted from an electrical angle phase of the first hall element by 180°; and an calculator which calculates a first electrical angle from an output of the first hall element and an output of the third hall element, calculates a second electrical angle from an output of the second hall element and an output of the third hall element, and calculates an estimated value of an electrical angle by weighting, wherein an electrical angle with a larger amplitude between the first electrical angle and the second electrical angle is multiplied by a relatively larger coefficient value.

The calculator may calculate the weighting coefficient by using the amplitude of the first electrical angle and the amplitude of the second electrical angle, and may calculate the estimated value by using a calculation result. When the amplitude of the first electrical angle is W1, the amplitude of the second electrical angle is W2, the weighting coefficient for the first electrical angle is C1, and the weighting coefficient for the second electrical angle is C2, the calculator may calculate C1 by the following equation (1) and may calculate C2 by the following equation (2):

$$C1 = W1/(W1+W2) \tag{1}$$

$$C2 = W2/(W1+W2) \tag{2}$$

The armatures with the following configuration may be employed. The armatures include a pair of first-phase armatures, second-phase armatures arranged side by side between the pair of first-phase armatures, and third-phase armatures arranged side by side adjacent to the pair of second-phase armatures, the first hall element is disposed at a position of one armature of the pair of first-phase armatures, the second hall element is disposed at a position of the other armature of the pair of first-phase armatures, and the third hall element is disposed between the pair of second-phase armatures and the pair of third-phase armatures. The first hall element, the second hall element, and the third hall element may be disposed at ends of the armatures in a direction perpendicular to the movement direction.

One aspect of a movable body system of the present invention includes: the above linear motor system; a movement route provided with the field system; and a movable body that is provided with the armatures and moves along the movement route by the linear motor system.

One aspect of an electrical angle estimating method of the present invention is an electrical angle estimating method in a linear motor system including a field system in which magnets are arrayed such that polarities are alternately different, armatures arranged facing the field system, and a magnetic detector which includes a first hall element, a second hall element, and a third hall element that are disposed in ranges of the armatures in a movement direction of the armatures with respect to the field system and detects a magnetic field generated by the field system, and in which an electrical angle phase of the third hall element is shifted from an electrical angle phase of the first hall element by 90° and an electrical angle phase of the second hall element is shifted from an electrical angle phase of the first hall element by 180°. The electrical angle estimating method includes: calculating a first electrical angle from an output of the first hall element and an output of the third hall element; calculating a second electrical angle from an output of the second hall element and an output of the third hall element; and calculating an estimated value of an electrical angle by weighting, wherein an electrical angle with a larger amplitude between the first electrical angle and the second electrical angle is multiplied by a relatively larger coefficient value.

As a result of conducting earnest research and development, the present inventors have found that an error of the first electrical angle and an error of the second electrical angle which are caused by excitation of the armatures have a positive/negative inverted relation, and that those errors have a correspondence relation with both the amplitude of the first electrical angle and the amplitude of the second electrical angle. According to the findings, as for the error of each of the first electrical angle and the second electrical angle, the error is smaller as the amplitude is larger, and the error is larger as the amplitude is smaller.

In the present invention, each of the hall elements is disposed in the range of the armature in the movement direction thereof, thereby enabling highly accurate detection of a magnetic field felt by the armatures. Further, the calculator calculates an estimated value of an electrical angle by weighting, where an electrical angle with a larger amplitude between the first electrical angle and the second electrical angle is multiplied by a relatively larger coefficient value. Hence the errors of the first electrical angle and the second electrical angle, caused by excitation of the armatures, are canceled off and an estimated value of an electrical angle with a small error is calculated. Thus, according to the present invention, the linear motor system can reduce an error caused by positional displacement between each of the hall elements and the armature and reduce an error caused by excitation of the armatures, to thereby estimate an electrical angle with high accuracy.

In the linear motor system in which the calculator calculates weighting coefficients by using the amplitude of the first electrical angle and the amplitude of the second electrical angle, since weighting coefficient values in accordance with the amplitudes are used, it is possible to significantly reduce an error caused by excitation of the armatures. In the linear motor system in which the calculator calculates weighting coefficients by using the above equations (1) and (2), it is possible to easily calculate weighting coefficient values in accordance with the amplitudes. In the linear motor system in which each of the above hall elements and the armatures of each phase are disposed in the above positional relation, it is possible to significantly reduce an error caused by excitation of the armatures. In the linear motor system in which each of the hall elements is disposed at the end of the armature, as compared to the case where each of the hall elements is disposed at the center of the armature, it is possible to reduce an influence on the hall elements due to excitation of the armatures, and reduce an error caused by excitation of the armatures.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

Hereinafter, an embodiment will be described with reference to the drawings. In each of the following figures, a direction in the figure will be described using an X-Y-Z coordinate system. In this X-Y-Z coordinate system, a perpendicular direction is taken as a Z direction, and horizontal directions are taken as an X direction and a Y direction. In each of the X direction, the Y direction, and the Z direction, a tip side of an arrow is referred to as a + (positive) side (e.g., +X side), and an opposite side thereto is referred to as a − (negative) side (e.g., −X side) as appropriate.

Figure 1:
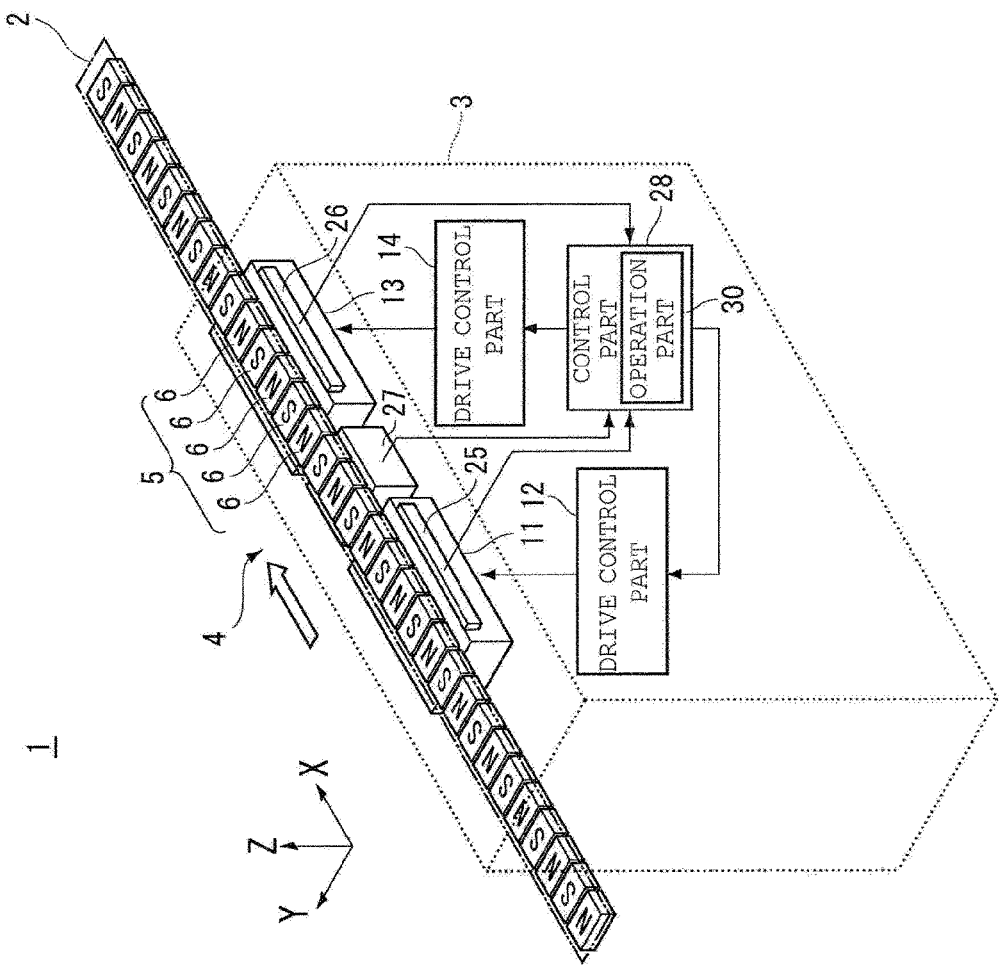
FIG. 1 illustrates a linear motor system and a movable body system according to an embodiment.

FIG. 1 illustrates a movable body system, to which a linear motor system according to an embodiment has been applied. A movable body system 1 is installed in a semiconductor device manufacturing factory, for example, and transports an article such as a FOUP (Front Opening Unified Pod) that houses semiconductor wafers used for manufacturing semiconductor devices, or a reticle pod that houses a processing member such as a reticle. The movable body system 1 is applicable to a facility other than those of the semiconductor field, and an article to be transported may be various articles that are handled in a facility installed with the movable body system 1. In the present embodiment, the movable body system 1 is a transport system that transports an article by an overhead travelling vehicle.

The movable body system 1 includes a track 2, a transport vehicle 3, and a linear motor system 4. The transport vehicle 3 is, for example, an overhead travelling vehicle such as an OHT (Overhead Hoist Transport) or an OHV (Overhead Hoist Vehicle). The track 2 is, for example, a travelling rail or the like and is provided on a ceiling of a facility. The linear motor system 4 supplies driving force that causes the transport vehicle 3 to drive. The transport vehicle 3 moves (travels) along the track 2 by the linear motor system 4. Hereinafter, each part of the movable body system 1 will be described in more detail.

The track 2 is a movement route provided with a field system 5. The track 2 is fixed to the ceiling or the like of a facility (e.g., a factory) provided with the movable body system 1. The field system 5 is a stator with a structure in which magnets 6 are arrayed such that polarities (south pole, north pole) are alternately different. The magnet 6 is a permanent magnet, and is fixed to the track 2.

The transport vehicle 3 includes a motor 11, a drive control part 12, a motor 13, and a drive control part 14. In the transport vehicle 3, each of the motor 11 and the motor 13 faces the magnets 6 on the track 2 and is fixed to a position close to the magnets 6. In FIG. 1, the movement direction of the transport vehicle 3 (indicated by an outline arrow) is parallel to the X direction. The motor 11 is provided on the rear side (the −X side) of the transport vehicle 3 in the movement direction. The motor 13 is provided on the front side (the +X side) of the transport vehicle 3 in the movement direction.

The motor 11 and the motor 13 are movable elements that move with respect to the field system 5 (the stator). The motor 11 and the field system 5, as well as the motor 13 and the field system 5, constitute an alternate current three-phase linear motor. Each of the motor 11 and the motor 13 changes a magnetic field such that its electrical angle and the magnetic pole of the field system 5 are synchronized with each other. Each of the drive control part 12 and the drive control part 14 is a servo-amplifier. The drive control part 12 supplies the motor 11 with a current to be used for generating the magnetic field. The drive control part 14 supplies the motor 13 with a current to be used for generating the magnetic field.

Figure 2A:
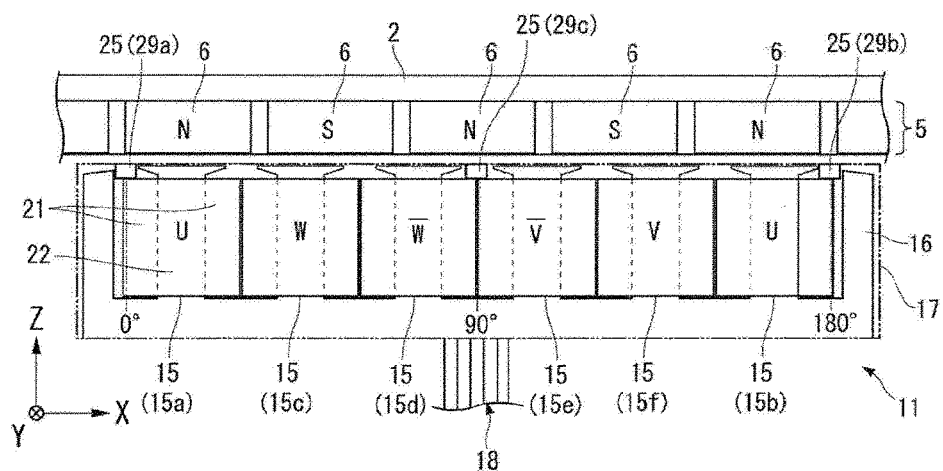
FIGS. 2A to 2C illustrate a motor according to the embodiment.
Figure 2B:
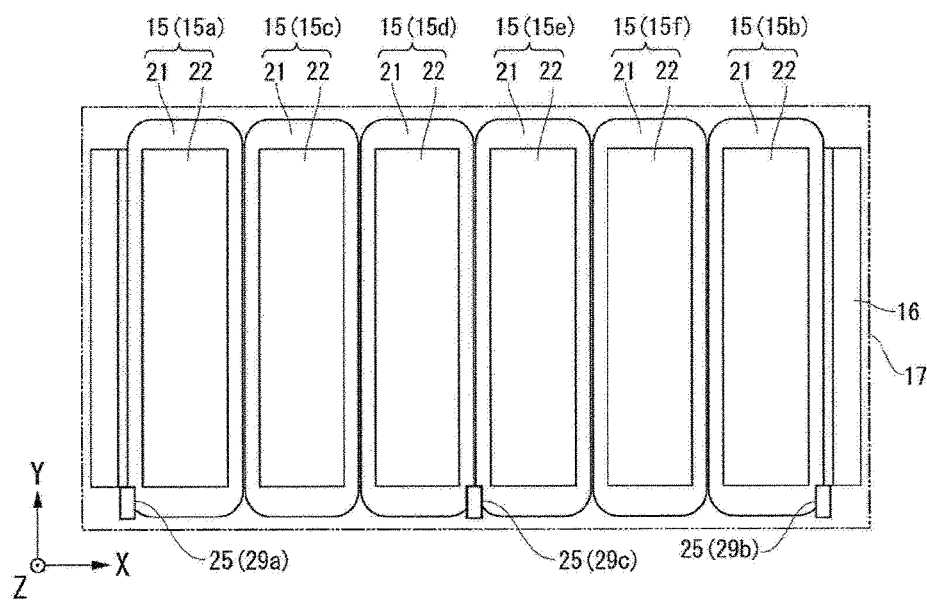
Figure 2C:
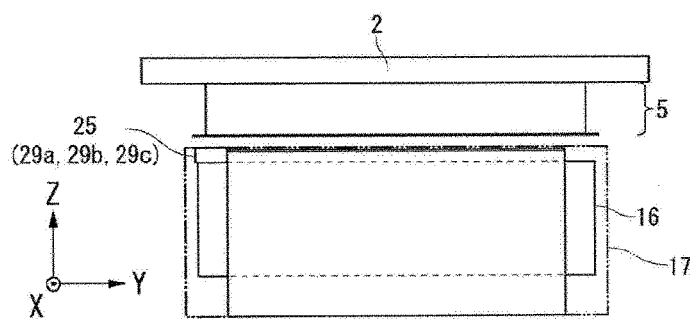

FIGS. 2A to 2C illustrate a motor according to the embodiment. The motor 11 and the motor 13 illustrated in FIG. 1 have similar configurations. Here, the motor 11 is described representatively while description of the motor 13 is omitted as appropriate. FIG. 2A is a view of the motor 11 seen from the −Y side (the lateral surface side). FIG. 2B is a view of the motor 11 seen from the +Z side (the upper surface side), and FIG. 2C is a view of the motor 11 seen from the +X side (the front side).

The motor 11 is provided with a plurality of armatures 15 that are disposed facing the field system 5, a holding part 16, a yoke 17, and wires 18. The plurality of armatures 15 are arrayed at almost regular intervals in the X-direction. The plurality of armatures 15 include first-phase armatures 15a, 15b, second-phase armatures 15c, 15d, and third-phase armatures 15e, 15f. Each of the pair of first-phase armatures 15a, 15b is a U-phase armature. Each of the pair of second-phase armatures 15c, 15d is a W-phase armature. Each of the pair of third-phase armatures 15e, 15f is a V-phase armature. When the armatures of the respective phases are not discriminated, each armature is denoted by reference numeral 15.

Of the pair of U-phase armatures 15a, 15b, one U-phase armature 15a is disposed on the most −X side among the plurality of armatures 15. Of the pair of U-phase armatures 15a, 15b, the other U-phase armature 15b is disposed on the most +X side among the plurality of armatures 15. The W-phase armatures 15c, 15d are arranged side by side between the pair of U-phase armatures 15a, 15b. The W-phase armature 15c (denoted by W in the figure) is disposed adjacent to the U-phase armature 15a on the +X side. The W-phase armature 15d (denoted by W with a bar in the figure) is disposed adjacent to the W-phase armature 15c on the +X side. The V-phase armatures 15e, 15f are arranged side by side adjacent to the pair of W-phase armatures 15c, 15d. The V-phase armature 15e (denoted by V with a bar in the figure) is disposed adjacent to the W-phase armature 15d on the +X side. The V-phase armature 15f (denoted by V in the figure) is disposed adjacent to the V-phase armature 15e on the +X side, that is, adjacent to the U-phase armature 15b on the −X side.

Each of the plurality of armatures 15 includes a coil 21 and a core 22. The coil 21 is wound around the outer side of the core 22. The core 22 projects from the coil 21 on the +Z side. The tip of the core 22 is closer to the magnets 6 than the coil 21 is, and has a taper shape in which its outer form expands as the tip of the core 22 is closer to the magnets 6. All of the plurality of armatures 15 are fixed to the holding part 16 and held by the holding part 16.

The yoke 17 is provided so as to have upper portions of the plurality of armatures 15 open and to surround lateral sides of the plurality of armatures 15. In the Z direction, the upper end of the yoke 17 corresponds to the upper end of the motor 11, and the armatures 15 are disposed such that the upper ends thereof do not project above the yoke 17. In the Y direction, the yoke 17 is wider than the holding part 16, and extends out from the holding part 16 on each of the −Y side and the +Y side with respect to the holding part 16. The wires 18 are electrically connected with the plurality of armatures 15 (to be described in FIG. 3), and the wires 18 are drawn downward at the end of the motor 11 in the Y direction to be electrically connected with the drive control part 12 illustrated in FIG. 1.

Figure 3:
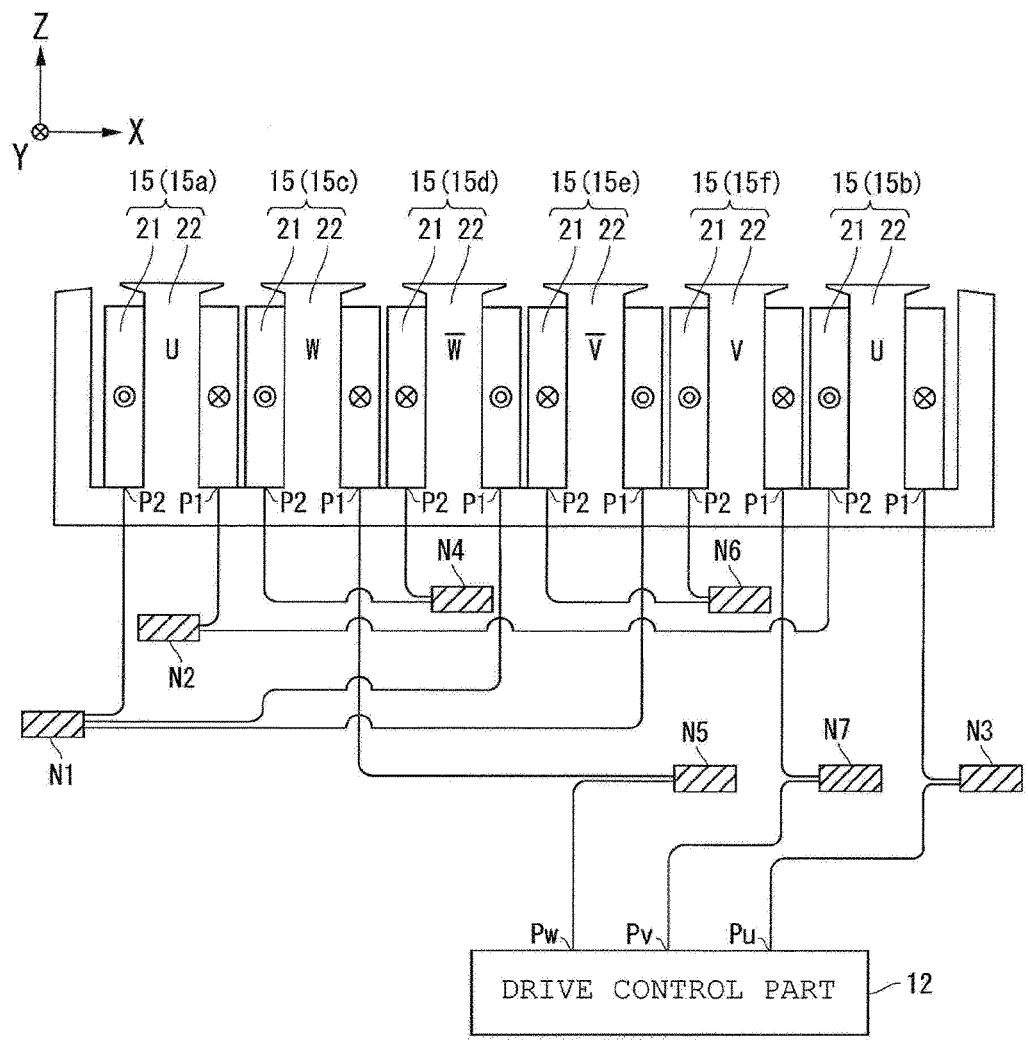
FIG. 3 illustrates an arrangement and a connection relation of armatures.

FIG. 3 illustrates an arrangement and a connection relation of the armatures. The plurality of armatures 15 each include a first terminal P1 electrically connected with one end of the coil 21, and a second terminal P2 electrically connected with the other end of the coil 21. The first terminal P1 is a terminal on a winding start side of the coil 21. The second terminal P2 is a terminal on a winding end side of the coil 21. The second terminal P2 of the U-phase armature 15a, the first terminal P1 of the W-phase armature 15d, and the first terminal P1 of the V-phase armature 15e are electrically connected with a node N1 through wires. The node N1 is a star connection (a Y connection, a star-shaped connection), that is, a connection for connecting each of three phases by a neutral point at its one end. The node N1 is electrically connected with a ground terminal (not illustrated) that serves as a reference potential.

The pair of armatures in each phase (e.g., the U-phase armatures 15a, 15b) are connected in series. The first terminal P1 of the U-phase armature 15a is electrically connected with the second terminal P2 of the U-phase armature 15b through a node N2. The first terminal P1 of the U-phase armature 15b is electrically connected with a U-phase terminal Pu of the drive control part 12 through a node N3. The second terminal P2 of the W-phase armature 15c is electrically connected with the second terminal P2 of the W-phase armature 15d through a node N4. The first terminal P1 of the W-phase armature 15c is electrically connected with a W-phase terminal Pw of the drive control part 12 through a node N5. The second terminal P2 of the V-phase armature 15e is electrically connected with the second terminal P2 of the V-phase armature 15f through a node N6. The first terminal P1 of the V-phase armature 15f is electrically connected with a V-phase terminal Pv of the drive control part 12 through a node N7.

Returning to the description of FIG. 1, the transport vehicle 3 is provided with a magnetic detection part 25, a magnetic detection part 26, a magnetic pole sensor 27, and a control part 28. The magnetic detection part 25 is provided in the motor 11 and detects the magnetic field generated by the field system 5 at the position of the motor 11. The magnetic detection part 26 is provided in the motor 13 and detects the magnetic field generated by the field system 5 at the position of the motor 13. Each of the magnetic detection part 25 and the magnetic detection part 26 is communicably connected with the control part 28 and outputs its detection result to the control part 28.

The magnetic detection part 25 and the magnetic detection part 26 have similar configurations. Here, the configuration of the magnetic detection part 25 is described representatively while description of the magnetic detection part 26 is omitted as appropriate. As illustrated in FIG. 2, the magnetic detection part 25 includes a first hall element 29a, a second hall element 29b, and a third hall element 29c. Each of the first hall element 29a, the second hall element 29b, and the third hall element 29c is a magnetic conversion element. When the direction of the magnetic field with respect to the magnetically sensible surface of the magnetic conversion element changes, the magnetic conversion element outputs an electrical signal corresponding to the changed angle. Each of the first hall element 29a, the second hall element 29b, and the third hall element 29c is disposed in the range of the armature 15 (the motor 11) in the movement direction (the X direction) of the armature 15 with respect to the field system 5 (the magnets 6). Each of the first hall element 29a, the second hall element 29b, and the third hall element 29c detects the magnetic field generated by the field system 5.

FIG. 2A also represents an electrical angle phase of the motor 11 at the position of each of the hall elements. Here, the position of the first hall element 29a is taken as a reference (the phase of the electrical angle is 0°). The first hall element 29a is disposed at a position of one (−X side) armature (15a) of the pair of U-phase armatures 15a, 15b. The second hall element 29b is disposed at a position where the phase of the electrical angle is shifted from the first hall element 29a by 180°. The second hall element 29b is disposed at a position of one (+X side) armature (15b) of the pair of U-phase armatures 15a, 15b. The third hall element 29c is disposed between the pair of W-phase armatures 15c, 15d and the pair of V-phase armatures 15e, 15f. The third hall element 29c is disposed at a position where the phase of the electrical angle is shifted from the first hall element 29a by 90°.

Further, each of the first hall element 29a, the second hall element 29b, and the third hall element 29c is disposed on the side (the +Z side) closer to the magnet 6 than each of the coils 21 of the plurality of armatures 15 is. The height of each of the first hall element 29a, the second hall element 29b, and the third hall element 29c is adjusted so as not to project above the yoke 17. Each of the first hall element 29a, the second hall element 29b, and the third hall element 29c (cf. FIG. 2B) is disposed in a position so as to at least partially overlap the coil 21 when seen from the Z direction. Further, each of the first hall element 29a, the second hall element 29b, and the third hall element 29c is disposed so as to be close to the end side of the coil 21 in a direction (Y direction) perpendicular to the movement direction (X direction) of the armature 15 with respect to the field system 5. In FIG. 2B, any of the first hall element 29a, the second hall element 29b, and the third hall element 29c is disposed on the −Y side end of the coil 21.

Figure 4A:
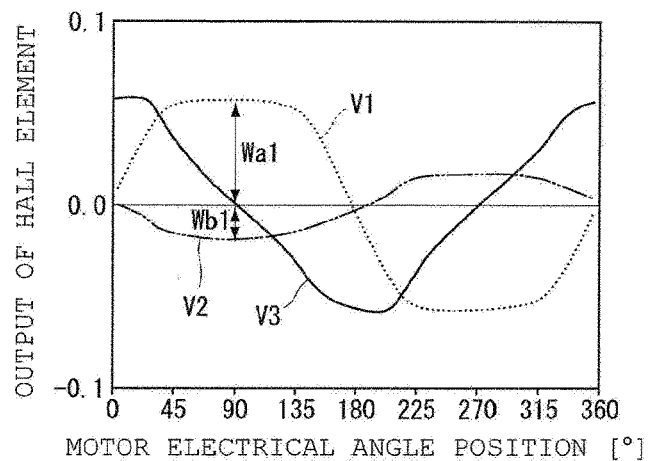
FIGS. 4A to 4C illustrate outputs of a magnetic detector in accordance with states of excitation.
Figure 4B:
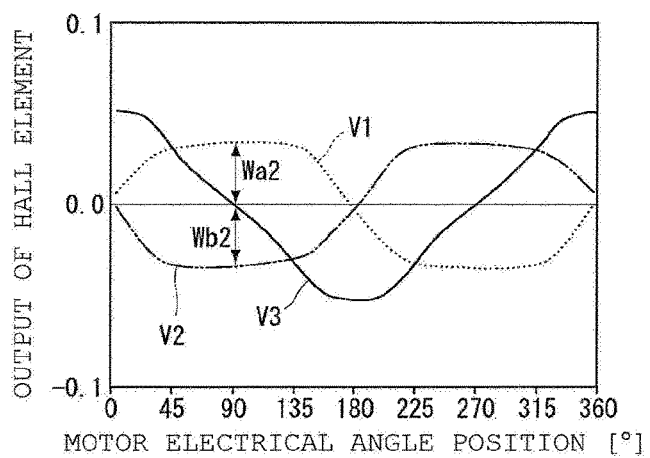
Figure 4C:
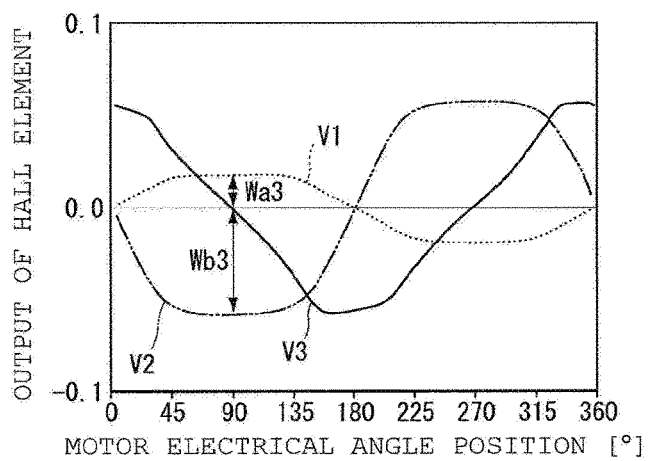

The control part 28 in FIG. 1 is provided with an operation part 30 for calculating an electrical angle. The operation part 30 calculates an electrical angle of the motor 11 (the motor 13) by using an output result of the magnetic detection part 25. FIGS. 4A to 4C illustrate outputs of the magnetic detection part in accordance with states of excitation. In each of the graphs of FIGS. 4A to 4C, a horizontal axis represents a motor electrical angle position [°], which corresponds to a theoretical value of an electrical angle which is defined by the relative position of the field system 5 and the armature 15 illustrated in FIG. 2. Further, in each of the graphs of FIGS. 4A to 4C, a vertical axis represents output values of the respective hall elements. Reference numeral V1 denotes an output value of the first hall element 29a. Reference numeral V2 denotes an output value of the second hall element 29b. Reference numeral V3 denotes an output value of the third hall element 29c.

FIG. 4A is a graph of an excitation state where a current in a predetermined direction is allowed to flow in the coil 21 illustrated in FIG. 2. FIG. 4B is a graph of a non-excitation state where a current is not allowed to flow in the coil 21. When comparison is made between FIGS. 4A and 4B in each position (e.g., 90°) of the motor electrical angle positions, an amplitude Wa1 of an output value V1 of the first hall element in FIG. 4A is larger than an amplitude Wa1 of an output value V1 of the first hall element in FIG. 4B. Further, an amplitude Wb1 of an output value V2 of the second hall element in FIG. 4A is smaller than an amplitude Wb2 of an output value V2 of the second hall element in FIG. 4B. Thus, in the excitation state, as compared to the non-excitation state, the amplitude of the output value V1 of the first hall element increases, whereas the amplitude of the output value V2 of the second hall element decreases.

FIG. 4C is a graph of an inverse excitation state where a current of the same value as that in FIG. 4A is allowed to flow in an inverted direction in the coil 21. When comparison is made between FIGS. 4C and 4B in each position (e.g., 90°) of the motor electrical angle positions, an amplitude Wa3 of the output value V1 of the first hall element in FIG. 4C is smaller than the amplitude Wa2 of the output value V1 of the first hall element in FIG. 4B. Further, an amplitude Wb3 of the output value V2 of the second hall element in FIG. 4C is larger than the amplitude Wb2 of the output value V2 of the second hall element in FIG. 4B. Thus, in the inverse excitation state, as compared to the non-excitation state, the amplitude of the output value V1 of the first hall element 29a decreases, whereas the amplitude of the output value V2 of the second hall element 29b increases.

The operation part 30 (cf. FIG. 1) calculates a first electrical angle ($\theta 1$) from the output value V1 of the first hall element 29a and the output value V3 of the third hall element 29c by the following equation (3):

$$\theta 1 = \arctan(V1/V3)[°] \quad (3)$$

The operation part 30 (cf. FIG. 1) calculates a second electrical angle ($\theta 2$) from the output value V2 of the second hall element 29b and the output value V3 of the third hall element 29c by the following equation (4):

$$\theta 2 = \arctan(V2/V3)[°] \quad (4)$$

Figure 5A:
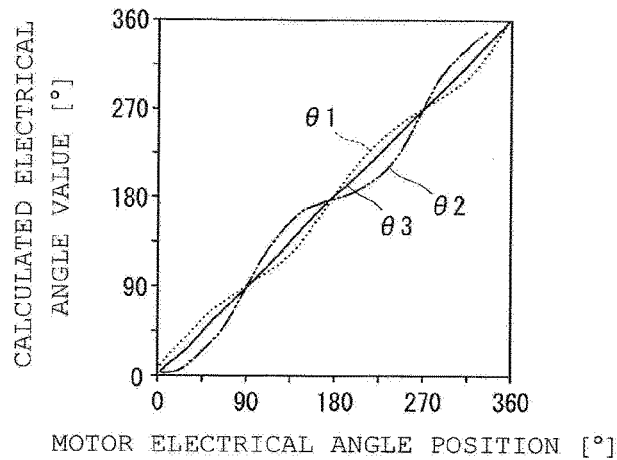
FIGS. 5A to 5C illustrate electrical angles calculated from outputs of the magnetic detector.
Figure 5B:
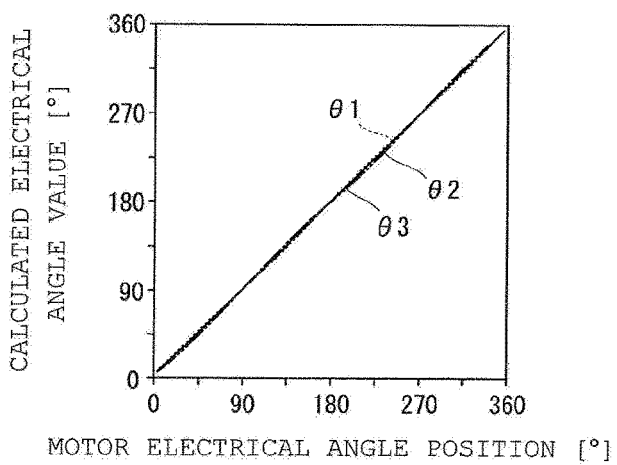
Figure 5C:
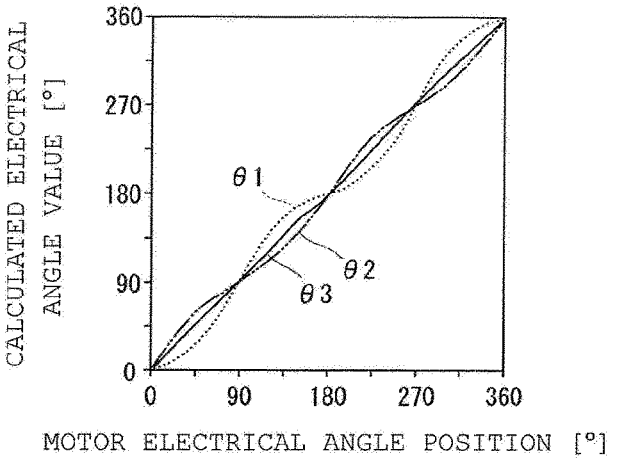

FIGS. 5A to 5C illustrate electrical angles calculated from outputs of the magnetic detection part. FIG. 5A is a graph of the excitation state described in FIG. 4. FIG. 5B is a graph of the non-excitation state. FIG. 5C is a graph of the inverse excitation state. In each of the graphs of FIGS. 5A to 5C, a horizontal axis represents a motor electrical angle position [°], and a vertical axis represents a calculated electrical angle value [°]. In each graph, reference numeral $\theta 3$ is a calculated estimated value of the electrical angle (to be described later). When it is assumed that the motor electrical angle position (a true value) is x and the calculated value of the electrical angle is y, the error of the calculated value is smaller as the calculated value is closer to y=x.

As illustrated in FIG. 5A, the calculated value of the first electrical angle $\theta 1$ and the calculated value of the second electrical angle $\theta 2$ which correspond to the excitation state fluctuate with respect to the true value (a straight line of y=x above). For example, the first electrical angle $\theta 1$ and the second electrical angle $\theta 2$ periodically fluctuate by taking the range of the motor electrical angle position from 0° to 180° as one period. The first electrical angle $\theta 1$ is on the positive side of the true value (y=x) with the horizontal axis in the range from 0° to about 90°, and is on the negative side of the true value (y=x) with the horizontal axis in the range from 90° to about 180°. The second electrical angle $\theta 2$ is on the negative side of the true value (y=x) with the horizontal axis in the range from 0° to about 90°, and the second electrical angle $\theta 2$ is on the positive side of the true value (y=x) with the horizontal axis in the range from 90° to about 180°.

Further, as illustrated in FIG. 5B, each of the first electrical angle $\theta 1$ and the second electrical angle $\theta 2$ in the non-excitation state is almost the same value as the motor electrical angle position (the true value) (on the straight line of y=x). Accordingly, each of the first electrical angle θ1 and the second electrical angle θ2 in the non-excitation state is appropriated to the true value.

Similarly, also in the inverse excitation state illustrated in FIG. 5C, the calculated values of the electrical angles fluctuate with respect to the true value, but the positive/negative relation with true value is inverted as compared to the excitation state in FIG. 5A. For example, the first electrical angle θ1 is on the negative side of the true value (y=x) with the horizontal axis in the range from 0° to about 90°, and the first electrical angle θ1 is on the positive side of the true value (y=x) with the horizontal axis in the range from 90° to about 180°. The second electrical angle θ2 is on the positive side of the true value (y=x) with the horizontal axis in the range from 0° to about 90°, and the second electrical angle θ2 is on the negative side of the true value (y=x) with the horizontal axis in the range from 90° to about 180°.

Figure 6A:
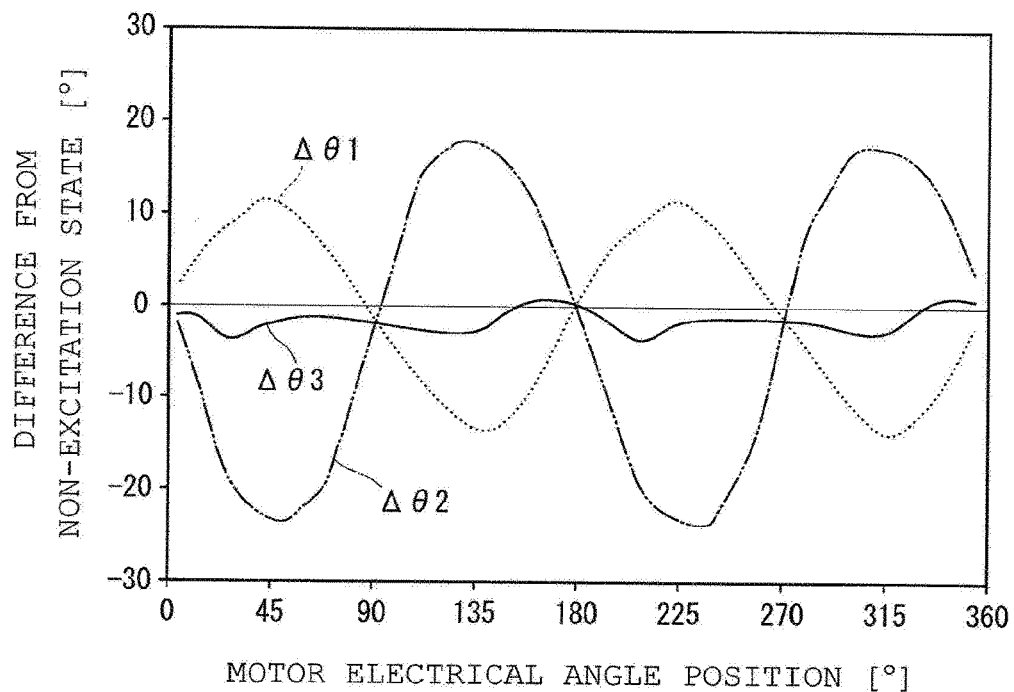
FIGS. 6A and 6B illustrate relative errors of electrical angles calculated from outputs of the magnetic detector.
Figure 6B:
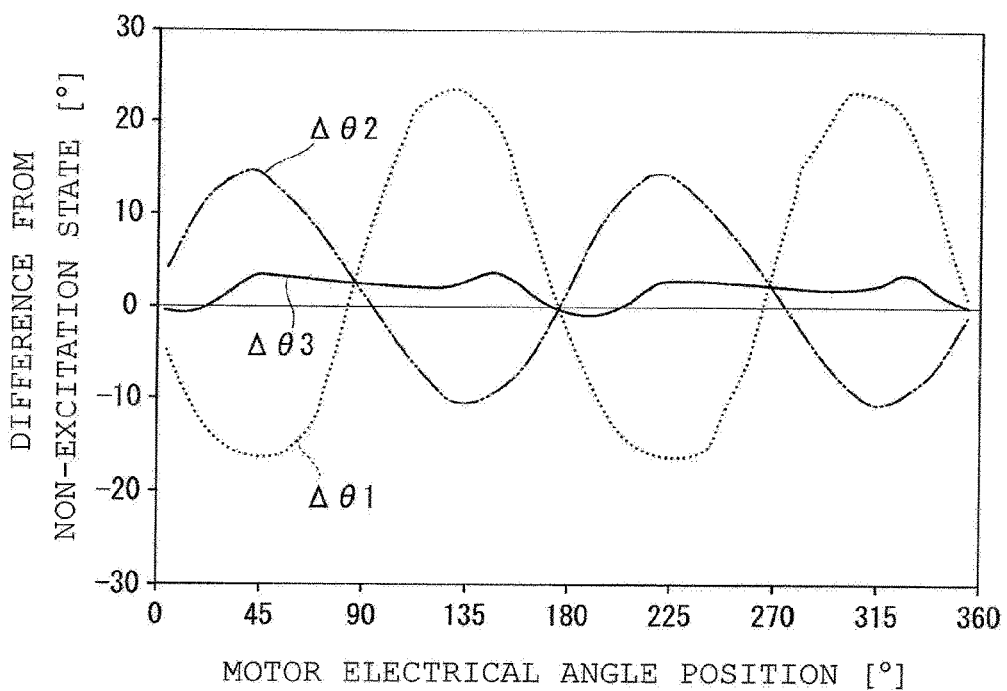

FIGS. 6A and 6B illustrate relative errors of the electrical angles calculated from outputs of the magnetic detection part. In FIG. 6A, reference numeral Δθ1 denotes an error of the first electrical angle θ1, a value obtained by subtracting the first electrical angle θ1 in the non-excitation state from the first electrical angle θ1 in the excitation state. Reference numeral Δθ2 denotes an error of the second electrical angle θ2, a value obtained by subtracting the second electrical angle θ2 in the non-excitation state from the second electrical angle θ2 in the excitation state. Each of the error Δθ1 of the first electrical angle θ1 and the error Δθ2 of the second electrical angle θ2 fluctuates in a sinusoidal form with respect to the motor electrical angle position, and are in the positive/negative inverted relation. An amplitude of the error Δθ1 of the first electrical angle θ1 is different from an amplitude of the error Δθ2 of the second electrical angle θ2.

For example, in FIG. 6A, the amplitude of the error Δθ1 of the first electrical angle θ1 is about 10°, and the amplitude of the error Δθ2 of the second electrical angle θ2 is about 20°. In the inverse excitation state in FIG. 6B, the relation between the first electrical angle θ1 and the second electrical angle θ2 is replaced with that in the excitation state in FIG. 6A. That is, the amplitude of the error Δθ1 of the first electrical angle θ1 is about 20°, and the amplitude of the error Δθ2 of the second electrical angle θ2 is about 10°.

Since the amplitude of the error of each electrical angle has the correspondence relation with the amplitude of each electrical angle, the electrical angle with a larger amplitude between the first electrical angle θ1 and the second electrical angle θ2 has a larger error. Further, since the positive and negative of the errors are inverted between the first electrical angle θ1 and the second electrical angle θ2, the present inventors have found that performing weighting on the first electrical angle θ1 and the second electrical angle θ2 allows calculation of an estimated value of an electrical angle with a reduced error.

In the present embodiment, the operation part 30 (cf. FIG. 1) calculates an amplitude (W1) of the first electrical angle θ1 from the output value (V1) of the first hall element 29a and the output value (V3) of the third hall element 29c by the following equation (5). Further, the operation part 30 calculates an amplitude (W2) of the second electrical angle θ2 from the output value (V2) of the second hall element 29b and the output value (V3) of the third hall element 29c by the following equation (6):

$$W1=\sqrt{(V1^2+V3^2)} \qquad (5)$$

$$W2=\sqrt{(V2^2+V3^2)} \qquad (6)$$

The operation part 30 performs weighting (takes a weighted average) by using the first electrical angle θ1 and the second electrical angle θ2 to calculate the estimated value of the electrical angle. In this weighting, the electrical angle with a larger amplitude between the first electrical angle θ1 and the second electrical angle θ2 is multiplied by a relatively larger coefficient. It is assumed herein that a weighting coefficient for the first electrical angle θ1 is C1, and a weighting coefficient for the second electrical angle θ2 is C2. When the amplitude W1 of the first electrical angle θ1 is larger than the amplitude W2 of the second electrical angle θ2, the coefficient C1 for the first electrical angle θ1 is set to a value larger than the coefficient C2 for the second electrical angle θ2. On the contrary, when the amplitude W1 of the first electrical angle θ1 is smaller than the amplitude W2 of the second electrical angle θ2, the coefficient C1 for the first electrical angle θ1 is set to a value smaller than the coefficient C2 for the second electrical angle θ2. For example, C1 is expressed by the following equation (7), and C2 is expressed by the following equation (8). That is, the operation part 30 calculates the estimated value (θ3) of the electrical angle by the following equation (9):

$$C1=W1/(W1+W2) \qquad (7)$$

$$C2=W2/(W1+W2) \qquad (8)$$

$$\theta3=W1/(W1+W2)\times\theta1+W2/(W1+W2)\times\theta2 \qquad (9)$$

In each of the graphs of FIGS. 6A and 6B, reference numeral Δθ3 denotes an error of the estimated value of the electrical angle calculated by the above equation (9). In each of FIGS. 6A and 6B, an absolute value of the error Δθ3 of the estimated value of the electrical angle is about 3° or smaller, which is smaller than either an absolute value of the error Δθ1 of the first electrical angle θ1 or an absolute value of the error Δθ2 of the second electrical angle θ2. Thus, according to the present embodiment, the operation part 30 can reduce the error of the electrical angle caused by excitation of the armatures 15.

The control part 28 specifies the position of the motor 11 on the track 2 by using the estimated value θ3 of the electrical angle of the motor 11, the estimated value θ3 being calculated by the operation part 30. The control part 28 specifies the position of the motor 13 on the track 2 by using the estimated value of the electrical angle of the motor 13, the estimated value being calculated by the operation part 30. The control part 28 specifies the position of the transport vehicle 3 by using the specified positions of the motor 11 and the motor 13. As described above, since the error of the electrical angle is reduced, the control part 28 can specify the position of the transport vehicle 3 with high accuracy.

As illustrated in FIG. 1, the magnetic pole sensor 27 is provided between the motor 11 and the motor 13. The magnetic pole sensor 27 detects the magnetic field generated by the field system 5. The magnetic pole sensor 27 is communicably connected with the control part 28 and outputs its detection result to the control part 28. The detection result of the magnetic pole sensor 27 is, for example, used as a substitute for a detection result of the magnetic detection part 25 or a detection result of the magnetic detection part 26 at the time when the magnetic detection part 25 or the magnetic detection part 26 is disposed at a position on the track 2 where the magnet 6 does not exist.

The control part 28 is communicably connected with a host control device (not illustrated) and receives various commands, such as a travelling command, from this host control device. The control part 28 comprehensively controls each part of the transport vehicle 3 based on the command received from the host control device. For example, the control part 28 decides travelling conditions (e.g., a target position, a target speed) for the transport vehicle 3 based on the position of the transport vehicle 3 specified from the detection results of the magnetic detection parts 25, 26 and the above travelling command. As described above, by reduction in the error of the electrical angle, the control part 28 can specify the position of the transport vehicle 3 with high accuracy, to thereby decide appropriate conditions as the travelling conditions for the transport vehicle 3.

The control part 28 is communicably connected with each of the drive control part 12 and the drive control part 14, and supplies a target value in accordance with the decided travelling condition to each of the drive control part 12 and the drive control part 14. The drive control part 12 drives and controls the motor 11 so as to bring a travelling state for the transport vehicle 3 close to the target value supplied from the control part 28. Further, the drive control part 14 drives and controls the motor 13 so as to bring the travelling state for the transport vehicle 3 close to the target value supplied from the control part 28.

The linear motor system 4 according to the embodiment includes the field system 5, the armatures 15 (the motor 11 and the motor 13), the magnetic detection part 25, the magnetic detection part 26, and the operation part 30. Note that the linear motor system 4 may not include the motor 11 or the motor 13. Further, the linear motor system 4 may not include the magnetic detection part 25 when not provided with the motor 11, and may not include the magnetic detection part 26 when not provided with the motor 13.

In FIG. 1, the operation part 30 is provided in the control part 28, but the operation part 30 may be provided in a portion other than the control part 28. For example, the operation part 30 may be unitized with the magnetic detection part 25 or the magnetic detection part 26. Alternatively, the operation part 30 may be provided in each of the magnetic detection part 25 and the magnetic detection part 26.

Figure 7:
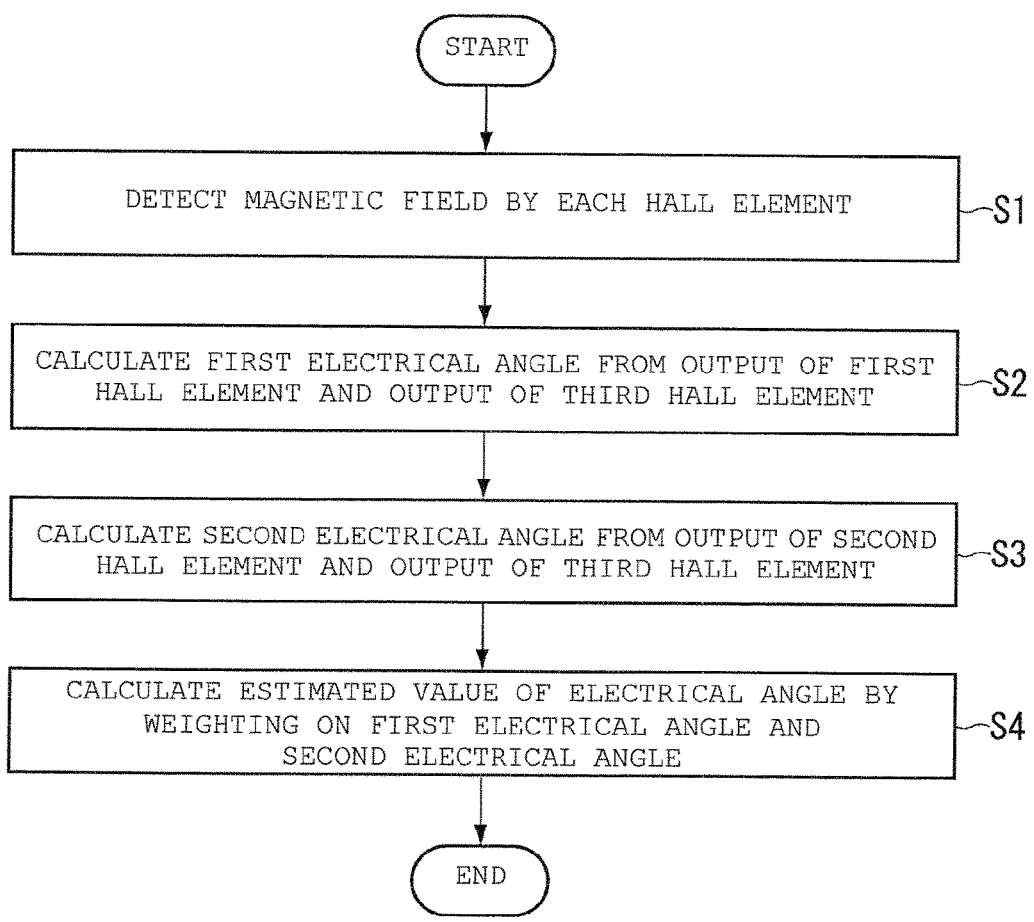
FIG. 7 is a flowchart illustrating an electrical angle estimating method according to the embodiment.

Next, based on the configuration of the linear motor system 4 described above, an electrical angle estimating method according to the embodiment will be described. FIG. 7 is a flowchart illustrating the electrical angle estimating method according to the embodiment. In Step S1, each of the hall elements (the first hall element 29a, the second hall element 29b, and the third hall element 29c) of the magnetic detection part 25 detects a magnetic field generated by the field system 5. In Step S2, the operation part 30 calculates the first electrical angle $\theta 1$ from an output of the first hall element 29a and an output of the third hall element 29c. In Step S3, the operation part 30 calculates the second electrical angle $\theta 2$ from an output of the second hall element 29b and an output of the third hall element 29c. Note that the operation part 30 may first perform either the process of Step S2 or the process of Step S3, and may perform, for example, the process of Step S3 before the process of Step S2. In Step S4, the operation part 30 calculates the estimated value $\theta 3$ of the electrical angle by weighting, where an electrical angle with a larger amplitude between the first electrical angle $\theta 1$ and the second electrical angle $\theta 2$ is multiplied by a relatively larger coefficient value. For example, the operation part 30 calculates the estimated value $\theta 3$ of the electrical angle by the above equation (9).

In the above embodiment, the control part 28 (the operation part 30) includes a computer, for example. The control part 28 reads a program stored in a storage part (not illustrated) and executes a variety of processing in accordance with this program. This program is, for example, an electrical angle estimation program in a linear motor system including a field system in which magnets are arrayed such that polarities are alternately different, armatures arranged facing the field system, and a magnetic detector which includes a first hall element, a second hall element, and a third hall element that are disposed in ranges of the armatures in a movement direction of the armatures with respect to the field system and detects a magnetic field generated by the field system, and in which an electrical angle phase of the third hall element is shifted from an electrical angle phase of the first hall element by 90° and an electrical angle phase of the second hall element is shifted from an electrical angle phase of the first hall element by 180°. This program may be recorded in a computer readable storage medium and then provided, the program causing the computer to execute calculating a first electrical angle from an output of the first hall element and an output of the third hall element, calculating a second electrical angle from an output of the second hall element and an output of the third hall element, and calculating an estimated value of an electrical angle by weighting, wherein an electrical angle with a larger amplitude between the first electrical angle and the second electrical angle is multiplied by a relatively larger coefficient value.

Note that the movable body system 1 according to the embodiment may be a system in which the track 2 is provided on the floor of the facility and the transport vehicle 3 travels on the floor. The movable body according to the embodiment may be a vehicle or the like other than the transport vehicle 3, or may be a movable member such as a robot armor a stage. The linear motor system 4 according to the embodiment may be a system in which the movable body is moved in a one-dimensional manner along a linear movement route, or may be a system in which the movable body is moved in a two-dimensional manner like a flat motor.

In the above embodiment, the operation part 30 calculates the estimated value $\theta 3$ of the electrical angle by the equation (9), but the estimated value of the electrical angle may be calculated by an equation different from the equation (9). For example, the weighting coefficient C1 for the first electrical angle $\theta 1$ may be expressed by the following equation (10), and the weighting coefficient C2 for the second electrical angle $\theta 2$ may be expressed by the following equation (11). Also in this case, for the electrical angle with a larger amplitude between the first electrical angle $\theta 1$ and the second electrical angle $\theta 2$, a larger weighting coefficient is used. Thus, functions to express the weighting coefficients C1, C2 are set arbitrarily.

$$C1=W1^2/(W1^2+W2^2) \quad (10)$$

$$C2=W2^2/(W1^2+W2^2) \quad (11)$$

Further, in the above embodiment, the weighting coefficients (C1, C2) are variable values with the amplitude W1 of the first electrical angle $\theta 1$ and the amplitude W2 of the second electrical angle $\theta 2$ taken as variables, but the weighting coefficients (C1, C2) may be fixed values. For example, the operation part 30 may have a coefficient C3 being a fixed value (e.g., ⅓) and a coefficient C4 being a fixed value (e.g., ⅔) larger than the coefficient C3. The operation part 30 may then multiply the electrical angle with a larger amplitude between the first electrical angle $\theta 1$ and the second electrical angle $\theta 2$ by the coefficient C4, while multiplying the electrical angle with a smaller amplitude by the coefficient C3, and take a sum of these multiplied values to calculate the estimated value of the electrical angle.

Note that the technical scope of the present invention is not limited to the aspect described in the above embodiment and the like. One or more of the requirements described in the above embodiment and the like may be omitted. Further, the requirements described in the above embodiment and the like can be combined as appropriate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A linear motor system comprising:
   a field system in which magnets are arrayed such that polarities are alternately different;
   armatures arranged facing the field system;
   a magnetic detector which includes a first hall element, a second hall element, and a third hall element that are disposed in ranges of the armatures in a movement direction of the armatures with respect to the field system and detects a magnetic field generated by the field system, and in which an electrical angle phase of the third hall element is shifted from an electrical angle phase of the first hall element by 90° and an electrical angle phase of the second hall element is shifted from an electrical angle phase of the first hall element by 180°; and
   a calculator which calculates 1) a first electrical angle from an output of the first hall element and an output of the third hall element, 2) a second electrical angle from an output of the second hall element and an output of the third hall element, 3) a weighting coefficient by using the amplitude of the first electrical angle and the amplitude of the second electrical angle, and 4) an estimated value of an electrical angle with a calculation result of weighting, wherein an electrical angle with a larger amplitude between the first electrical angle and the second electrical angle is multiplied by a relatively larger coefficient value and an electrical angle with a smaller amplitude between the first electrical angle and the second electrical angle is multiplied by a relatively smaller coefficient value.

2. The linear motor system of claim 1, wherein, when the amplitude of the first electrical angle is W1, the amplitude of the second electrical angle is W2, the weighting coefficient for the first electrical angle is C1, and the weighting coefficient for the second electrical angle is C2, the calculator calculates C1 by the following equation (1) and calculates C2 by the following equation (2):

$$C1 = W1/(W1+W2) \quad (1)$$

$$C2 = W2/(W1+W2) \quad (2).$$

3. The linear motor system of claim 2, wherein the armatures include:
   a pair of first-phase armatures;
   second-phase armatures arranged side by side between the pair of first-phase armatures; and
   third-phase armatures arranged side by side adjacent to the pair of second-phase armatures,
   wherein the first hall element is disposed at a position of one armature of the pair of first-phase armatures,
   wherein the second hall element is disposed at a position of the other armature of the pair of first-phase armatures, and
   wherein the third hall element is disposed between the pair of second-phase armatures and the pair of third-phase armatures.

4. The linear motor system of claim 2, wherein the first hall element, the second hall element, and the third hall element are disposed at ends of the armatures in a direction perpendicular to the movement direction.

5. The linear motor system of claim 1, wherein
   the armatures include:
   a pair of first-phase armatures;
   second-phase armatures arranged side by side between the pair of first-phase armatures; and
   third-phase armatures arranged side by side adjacent to the pair of second-phase armatures,
   wherein the first hall element is disposed at a position of one armature of the pair of first-phase armatures,
   wherein the second hall element is disposed at a position of the other armature of the pair of first-phase armatures, and
   wherein the third hall element is disposed between the pair of second-phase armatures and the pair of third-phase armatures.

6. The linear motor system of claim 5, wherein the first hall element, the second hall element, and the third hall element are disposed at ends of the armatures in a direction perpendicular to the movement direction.

7. The linear motor system of claim 1, wherein the first hall element, the second hall element, and the third hall element are disposed at ends of the armatures in a direction perpendicular to the movement direction.

8. A movable body system comprising:
   the linear motor system of claim 1;
   a movement route provided with the field system; and
   a movable body that is provided with the armatures and moves along the movement route by the linear motor system.

9. An electrical angle estimating method in a linear motor system, wherein the linear motor system comprises:
   a field system in which magnets are arrayed such that polarities are alternately different;
   armatures arranged facing the field system; and
   a magnetic detector which includes a first hall element, a second hall element, and a third hall element that are disposed in ranges of the armatures in a movement direction of the armatures with respect to the field system and detects a magnetic field generated by the field system, and in which an electrical angle phase of the third hall element is shifted from an electrical angle phase of the first hall element by 90° and an electrical angle phase of the second hall element is shifted from an electrical angle phase of the first hall element by 180°, and
   wherein the electrical angle estimating method comprises:
   calculating a first electrical angle from an output of the first hall element and an output of the third hall element;
   calculating a second electrical angle from an output of the second hall element and an output of the third hall element;
   calculating a weighting coefficient by using the amplitude of the first electrical angle and the amplitude of the second electrical angle; and
   calculating an estimated value of an electrical angle with a calculation result of weighting, wherein an electrical angle with a larger amplitude between the first electrical angle and the second electrical angle is multiplied by a relatively larger coefficient value, and an electrical angle with a smaller amplitude between the first electrical angle and the second electrical angle is multiplied by a relatively smaller coefficient value.

10. The method of claim 9, wherein
the armatures include:
a pair of first-phase armatures;
second-phase armatures arranged side by side between the pair of first-phase armatures; and
third-phase armatures arranged side by side adjacent to the pair of second-phase armatures,
wherein the first hall element is disposed at a position of one armature of the pair of first-phase armatures,
wherein the second hall element is disposed at a position of the other armature of the pair of first-phase armatures, and
wherein the third hall element is disposed between the pair of second-phase armatures and the pair of third-phase armatures.

11. The method of claim 9, wherein the first hall element, the second hall element, and the third hall element are disposed at ends of the armatures in a direction perpendicular to the movement direction.

* * * * *